(12) United States Patent
Nagai et al.

(10) Patent No.: US 6,633,102 B2
(45) Date of Patent: Oct. 14, 2003

(54) INSULATOR FOR ARMATURE OF DYNAMO-ELECTRIC MACHINE

(75) Inventors: Kenji Nagai, Shuuchi-gun (JP);
Hiroaki Kondo, Shuuchi-gun (JP);
Hisanobu Higashi, Shuuchi-gun (JP);
Takahiro Matsumoto, Shuuchi-gun (JP)

(73) Assignee: Kabushiki Kaisha Moric, Shuuchi-gun (JP)

( * ) Notice: Subject to any disclaimer, the term of this patent is extended or adjusted under 35 U.S.C. 154(b) by 0 days.

(21) Appl. No.: 10/064,927

(22) Filed: Aug. 29, 2002

(65) Prior Publication Data

US 2003/0048023 A1 Mar. 13, 2003

(30) Foreign Application Priority Data

Sep. 7, 2001 (JP) .......................... 2001-271480

(51) Int. Cl.⁷ .................... H02K 1/04; H02K 15/12; H02K 5/10; H02K 5/12; H02K 3/34
(52) U.S. Cl. ................ 310/215; 310/43; 310/45; 310/88
(58) Field of Search .................. 310/215, 45, 43, 310/88

(56) References Cited

U.S. PATENT DOCUMENTS

| | | | | |
|---|---|---|---|---|
| 4,015,154 A | * | 3/1977 | Tanaka et al. ............. 310/42 |
| 4,340,829 A | * | 7/1982 | McCoy ..................... 310/71 |
| 5,134,327 A | * | 7/1992 | Sumi et al. ............... 310/43 |
| 5,191,698 A | * | 3/1993 | Sumi et al. ............... 29/596 |
| 5,306,976 A | | 4/1994 | Beckman |
| 5,990,588 A | * | 11/1999 | Kliman et al. ............ 310/86 |
| 6,111,334 A | * | 8/2000 | Horski et al. ............ 310/254 |
| 6,274,962 B1 | * | 8/2001 | Kliman .................... 310/261 |
| 6,323,571 B1 | * | 11/2001 | Nakahara et al. ......... 310/71 |
| 6,351,042 B1 | * | 2/2002 | Takayanagi ............... 310/43 |
| 6,407,472 B1 | * | 6/2002 | Takayanagi ............... 310/45 |
| 6,492,749 B1 | * | 12/2002 | Shiga et al. .............. 310/43 |

FOREIGN PATENT DOCUMENTS

| | | |
|---|---|---|
| CH | 587579 | 5/1977 |
| DE | 710368 | 9/1941 |
| EP | 0064105 | 11/1982 |
| FR | 2778283 | 11/1999 |
| WO | WO 0014855 | 3/2000 |

OTHER PUBLICATIONS

European Search Report dated Dec. 12, 2002.

* cited by examiner

*Primary Examiner*—Dang Le
*Assistant Examiner*—J. Aguirrechea
(74) *Attorney, Agent, or Firm*—Ernest A. Beutler (57) ABSTRACT

An armature for a rotating electrical machine and more particularly to an insulating cover for the pole teeth around which the windings are formed that has good strength against the winding without risk of damage of the insulator due to increased thickness in the highly stressed areas.

11 Claims, 8 Drawing Sheets

INSULATOR FOR ARMATURE OF DYNAMO-ELECTRIC MACHINE

BACKGROUND OF INVENTION

This invention relates to a dynamo-electric machine and more particularly to an improved insulator for the armature thereof.

Rotating electrical machines have been proposed for many applications. For example they may be used as a starter motor for an internal combustion engine. In such an application, a DC electric motor is powered from a battery for starting the engine. The starter motor generally comprises a stator comprising a cylindrical yoke with a plurality of magnets circumferentially bonded to an inner surface of the yoke. An armature (rotor) having coils arranged opposite the magnets and supplied with electrical current for driving a rotating shaft of the armature forming a output shaft of the starter motor. The motor output shaft drives a crankshaft of the engine via a reduction gear, an overrunning clutch for starting the engine in a well known manner.

The magnets may be ordinary magnets obtained by magnetizing a ferrite type magnetic material. The coils are formed by winding a wire (in general, a thin wire having a diameter of 0.9 mm or less) on each of a plurality of radially arrayed magnetic pole teeth of the armature. These pole teeth have a general T-shape. At this time, the core pole teeth are covered with insulators around which the wire is wound. In order to reduce the size and to increase the power, starter motors employing high-energy neodymium type magnets instead of the ferrite type magnets has been developed. When neodymium type magnets are employed, the thickness of the magnets can be decreased and the output of the motor can be enhanced. When such high-energy neodymium magnets are employed, the coils are formed using a wire having a diameter of about 1 mm or greater so that a current corresponding to the energy of the magnets can flow.

This thick wire has a high rigidity, so that it requires a large tensile force to wind the wire around a magnetic pole tooth to form a coil. Thus, a large pressing force corresponding to the tensile force is exerted on coil end surfaces of the magnetic pole tooth. A method and apparatus for forming such windings is disclosed in the application entitled "WINDING METHOD AND DEVICE FOR AN ARMATURE FOR ROTARY ELECTRIC MACHINES", Ser. No. 10/064,923, filed concurrently herewith by the assignee hereof, based upon Japanese Application Serial Number 2001-271207, Filed Sep. 7, 2001.

Figure 3:
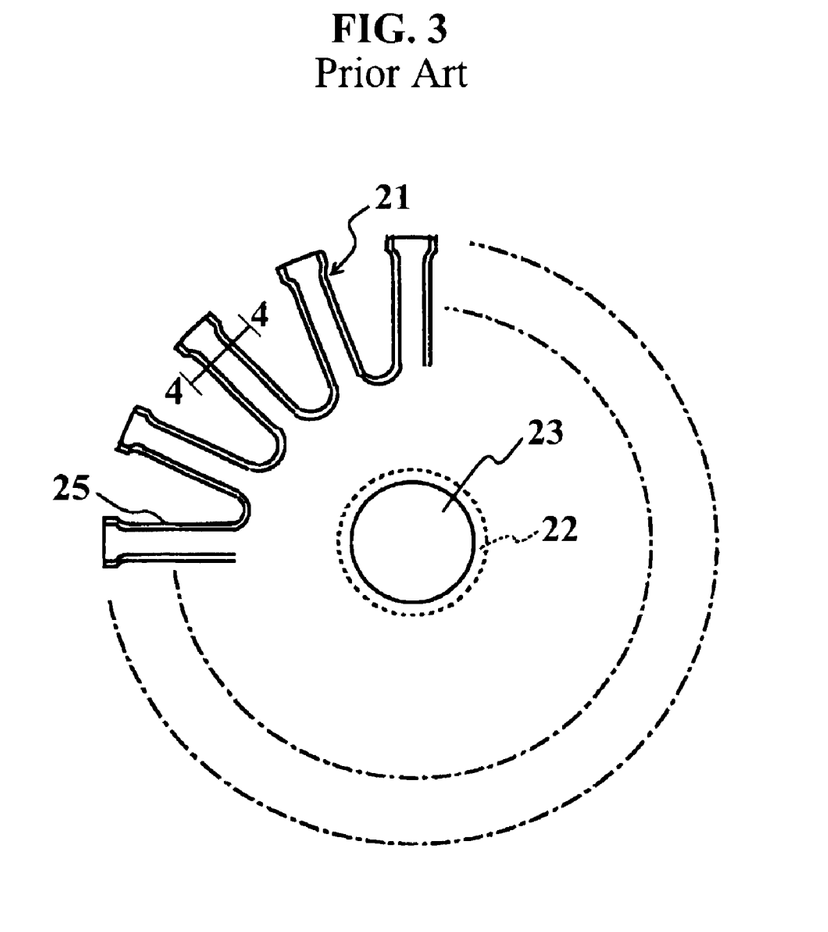
FIG. 3 is a bottom plan view of the insulator half shown in FIG. 1.
Figure 4:
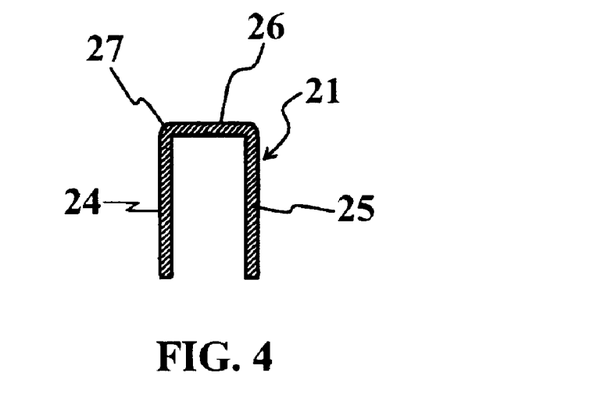
FIG. 4 is a cross sectional view taken along the lines 4—4 of FIGS. 1 and 3.

Although the method and apparatus described in that copending application is very effective in providing the coil winding, still further improvements can be made. For example, a large stress is applied to edges of the coil end surfaces, namely, edges of the magnetic pole tooth, against which the wire is bent and pressed. This problem can be particularly difficult in connection with the insulating material around which the wire is coiled. This may be understood best by reference to FIGS. 1 through 4. As noted below, these figures are, respectively, a top plan view of the one half of insulating material, a cross section taken along the line 2—2 of FIG. 1, a bottom plan view of the insulator half and a cross sectional view taken along the line 4—4 of FIG. 3.

Figure 1:
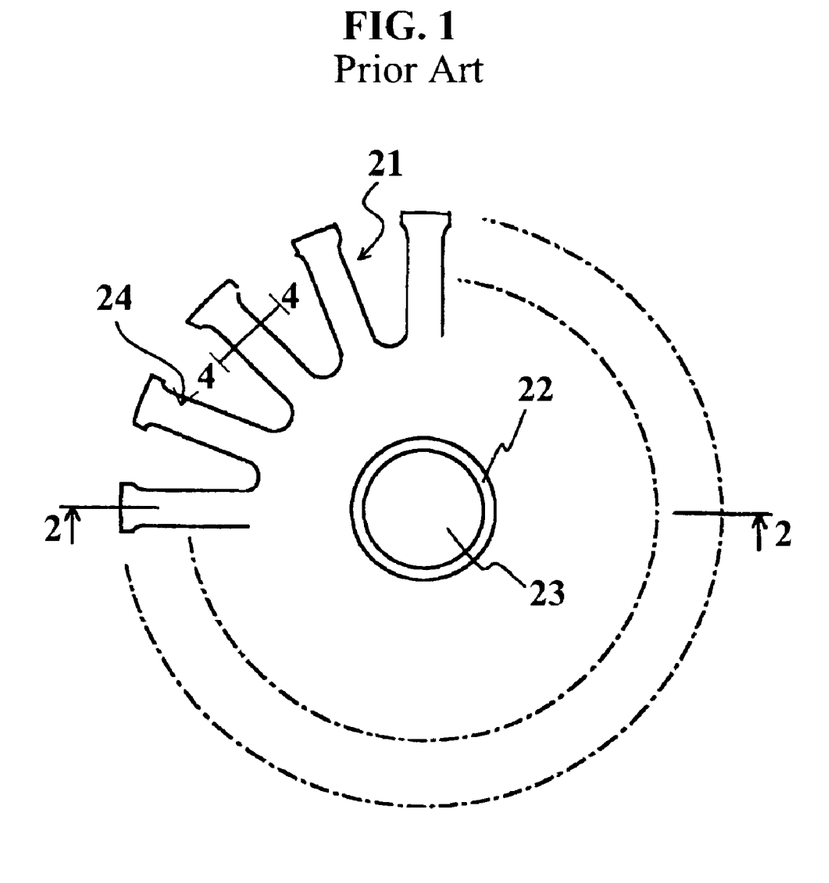
FIG. 1 is a top plan view of one of the insulator halves constructed in accordance with the prior art.
Figure 2:
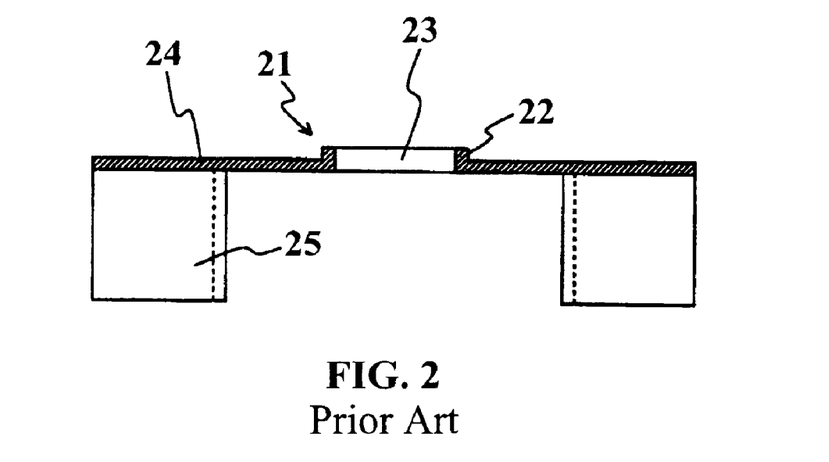
FIG. 2 is a cross sectional view taken along the line 2—2 of FIG. 1.

The insulating material is made up of two halves only one of which is shown and which is indicated generally by the reference numeral 21. Basically it has a configuration complimentary to the armature core. This is comprised of a central portion 22 that has an opening 23 for passing the shaft of the associated armature. Radially extending teeth 24, which are complimentary to the armature teeth, extend outwardly and have a generally U-shaped configuration as shown in the cross sectional views of FIGS. 2 and 4. Generally the insulator 21 is quite thin, having a thickness of only about 0.5 mm.

This shape is comprised of individual side portions 25 that face the sides of the armature teeth and which are joined by an integral bridging portion 26 that extends generally in an axial direction relative to the axis of rotation of the machine. As a result, curved edge portions 27 result which are actually thinner than the thickness of the portions 25 and 26 and may be damaged due to the high pressure and loading occurring during the winding operation. If this insulator becomes damaged, then breaking may occur during the winding operation to damage the efficiency of the machine.

It is, therefore, a principal object to this invention to provide an improved insulator arrangement for the armature of a rotating electrical machine wherein the strength of the insulator is increased with significantly increasing its size or weight.

SUMMARY OF INVENTION

This invention is adapted to be embodied in a rotating electrical machine comprised of an armature having a circular core of a magnetic material and a plurality of magnetic pole teeth extending radially from the circular core for cooperation with a plurality of circumferentially spaced permanent magnets. Each of the magnetic pole teeth defines a core of generally rectangular cross section with slots formed between circumferentially adjacent pole teeth. An insulator having channel shaped portions covers at least in part the cores of the magnetic pole teeth. The channel shaped portions are comprised of radially extending slot portions extending along the sides of the pole teeth facing the slots. The slot portions are integrally joined by an axial portion extending across an axial outermost side of the pole teeth. The axial portion of the insulator channel shaped portions have a thickness greater than that of the side portions to avoid thinning at the juncture therebetween. Coil windings are wound around the cores of the magnetic pole teeth with the insulator being interposed therebetween.

DETAILED DESCRIPTION

Figure 5:
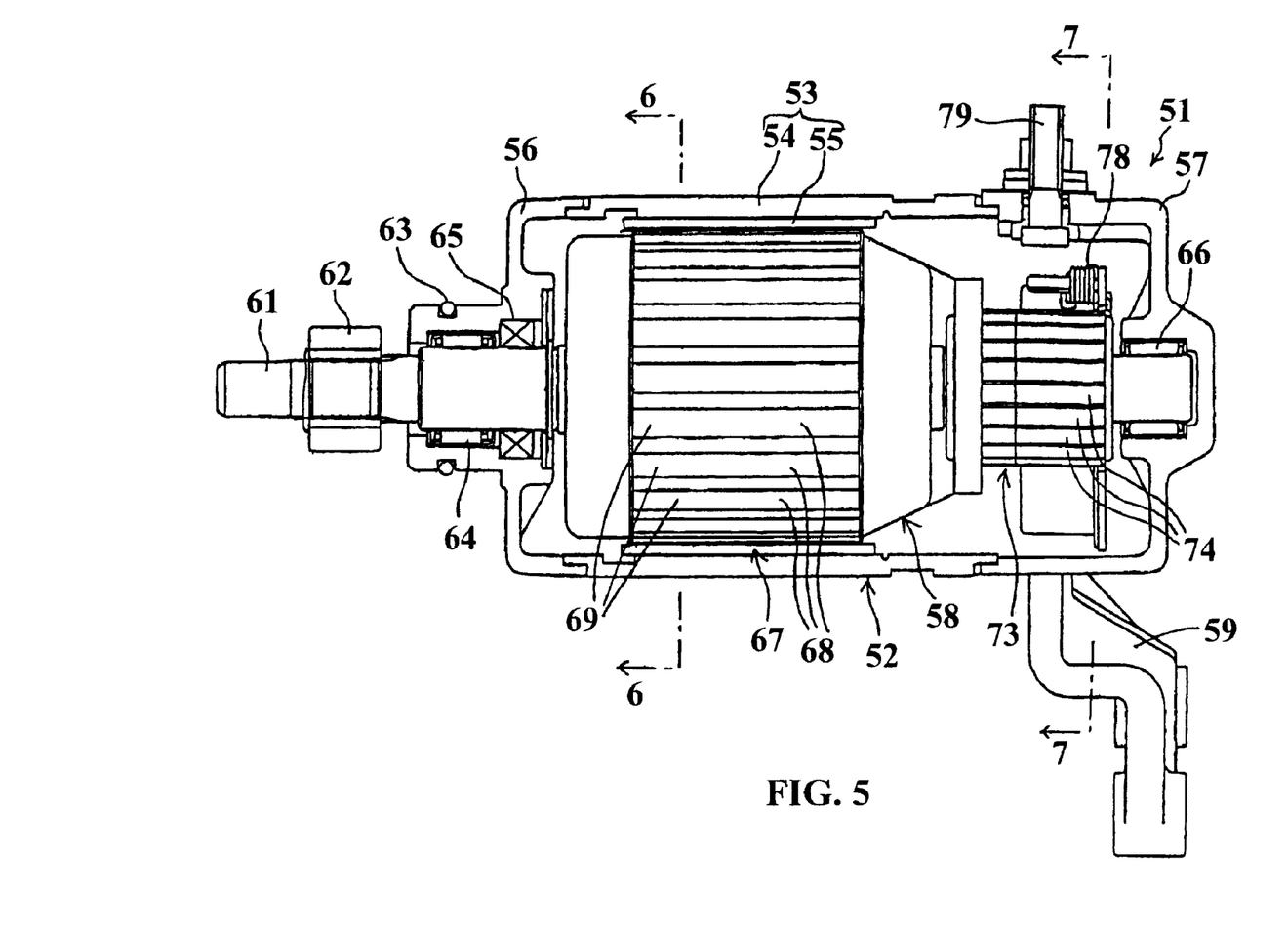
FIG. 5 is a cross sectional view taken generally along the axis of rotation of an electrical starter motor constructed in accordance with the invention.
Figure 6:
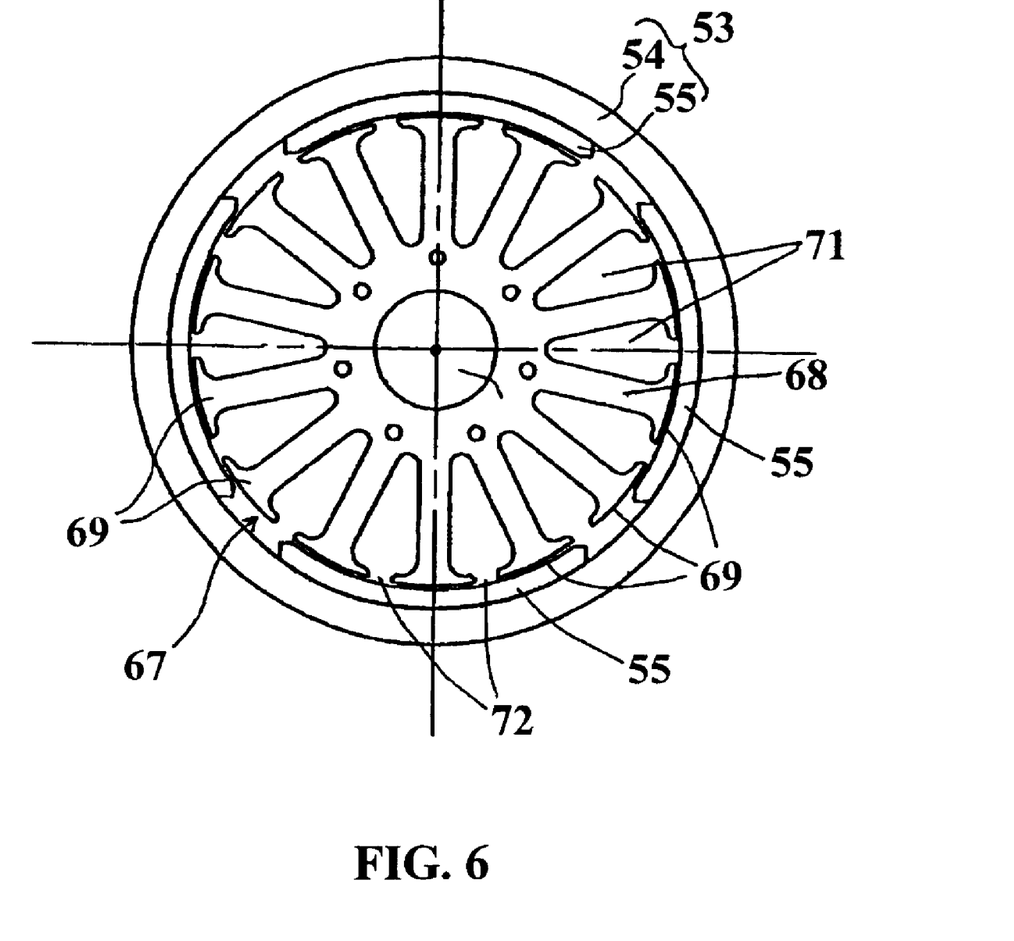
FIG. 6 is a cross sectional view taken along the line 6—6 of FIG. 5.
Figure 7:
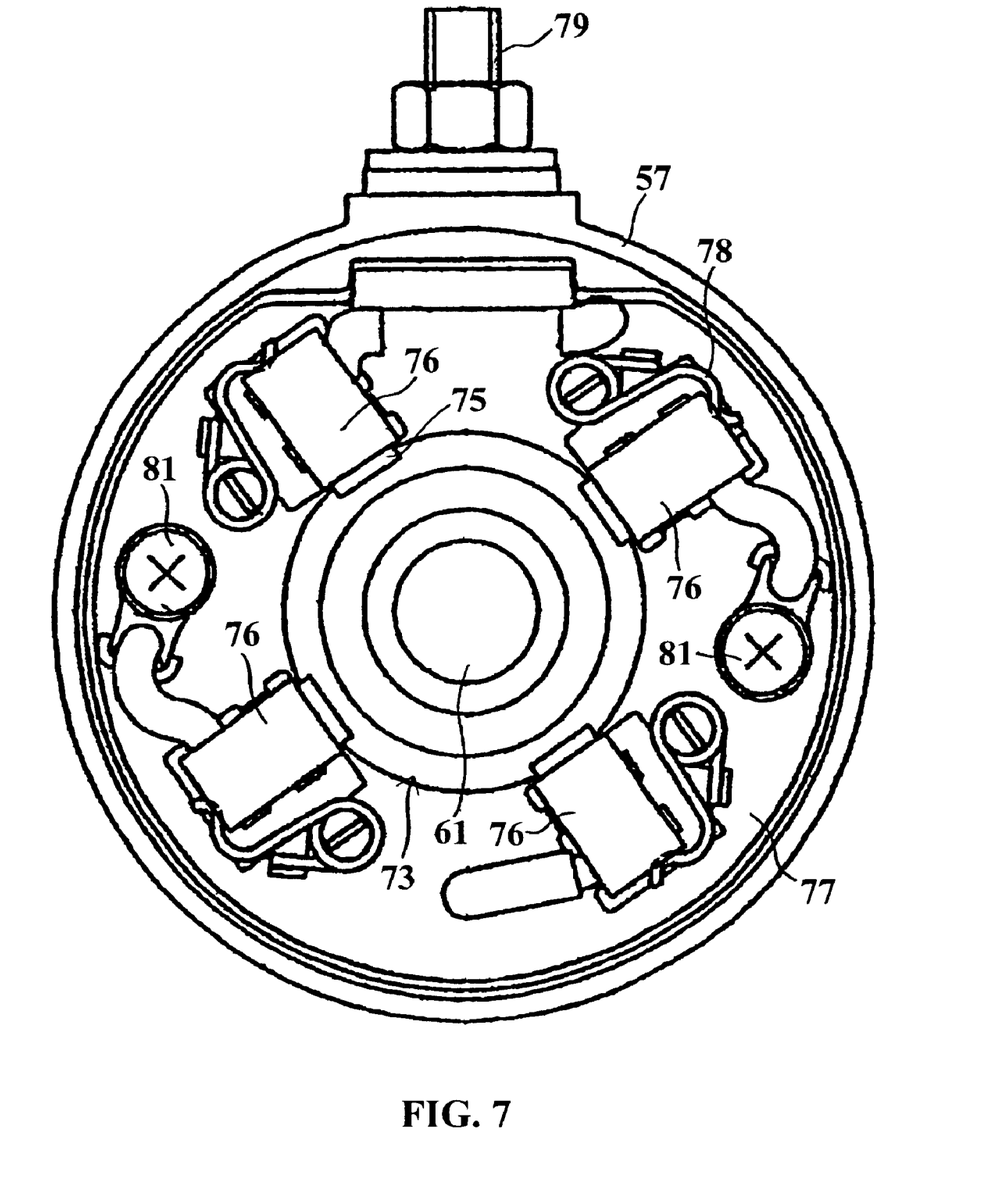
FIG. 7 is a cross sectional view taken along the line 7—7 of FIG. 5 and shows the brush carrier arrangement of the motor.
Figure 8:
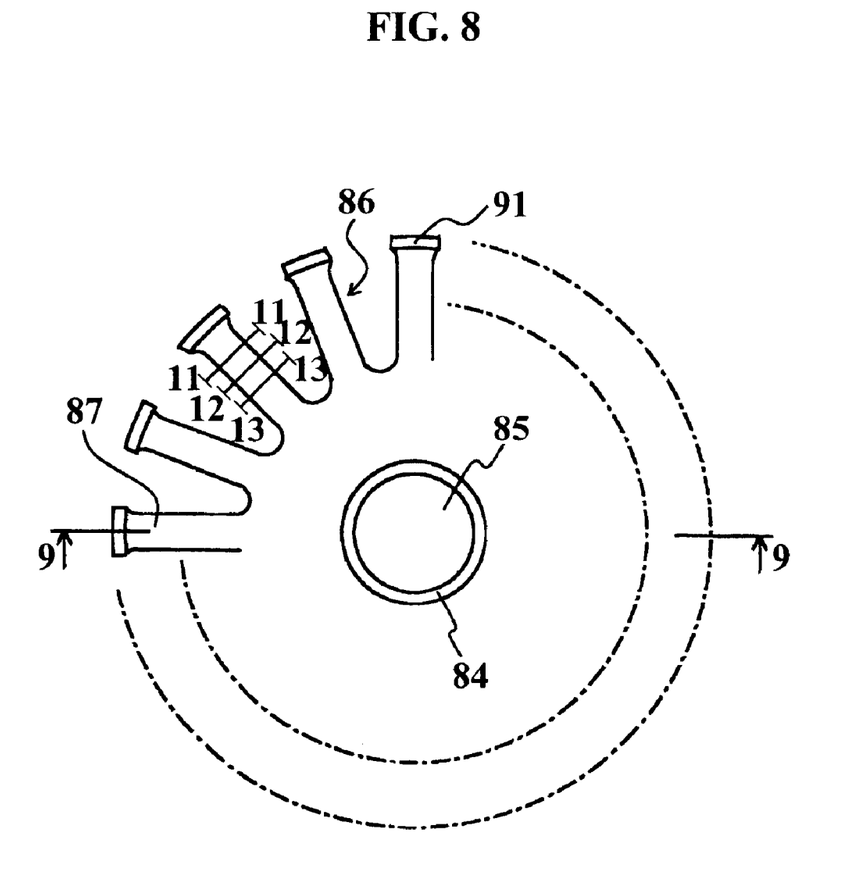
FIG. 8 is a top plan view, in part similar to FIG. 1, showing the insulator half constructed in accordance with the embodiment of the invention.
Figure 9:
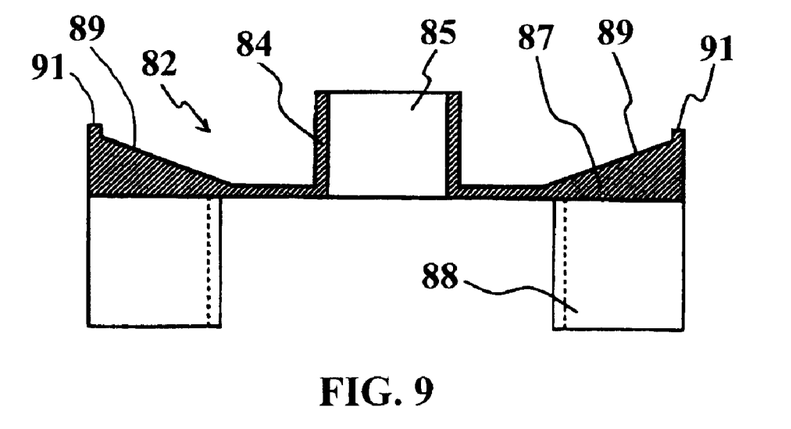
FIG. 9 is a cross sectional view taken along the line 9—9 of FIG. 8.
Figure 10:
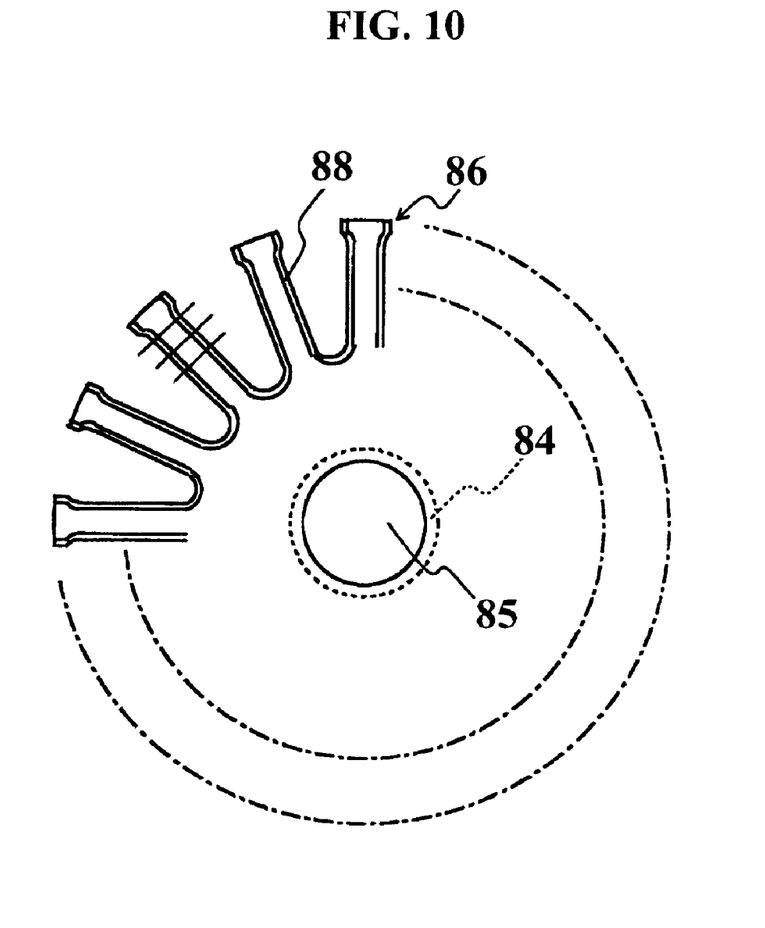
FIG. 10 is a bottom plan view, in part similar to FIG. 3, but showing the half illustrated in FIG. 1 from the opposite side.

Referring now in detail to the drawings and initially to FIGS. 5 through 7, a starter motor for an internal combustion engine is indicated generally by the reference numeral 51. The starter motor 51 is constructed in accordance with an embodiment of the invention and although this specific application is illustrated, it should be readily apparent to those skilled in the art that the invention can be utilized with other types of rotating electrical machines.

The starter motor 51 is comprised of an outer housing assembly, indicated generally by the reference numeral 52, which includes a cylindrical yoke portion, indicated generally by the reference numeral 53. The yoke portion 53 is comprised of a cylindrical shell 54 on the inner surface of which are bonded a plurality of circumferentially spaced permanent magnets 55. In the illustrated embodiment, there are four such permanent magnets 55 and they are arranged with alternating plurality in a circumferential direction. Preferably, these permanent magnets 55 are formed from a neodymium type material that provides a high energy permanent magnet.

The housing 52 is completed by means of a front end cap 56 and rear end cap 57 that are affixed in any suitable manner to the ends of the yoke shell 54 to define an enclosed space in which a rotor in the form of an armature, indicated generally by the reference numeral 58 is journal led. The rear end cap 57 is formed with a mounting bracket 59 so as to permit attachment to the body of the associated engine.

The rotor or armature 58 is comprised of an armature shaft 61, the forward end of which carries a starter gear 62 for associated with the starter gear on the flywheel of the associated internal combustion engine. The end cap 57 has a projecting end in which an O-ring seal 63 is received so as to provide a good seal around the starter gear. This end of the armature shaft 61 is journaled in the end cap 57 by an anti-friction bearing 64. An oil seal 65 is disposed immediately to the rear of the bearing 64. In a like manner, the rear end of the armature shaft 61 is journaled in an anti-friction bearing 66 carried by the end cap 57.

The armature 58 is comprised of a core, indicated generally by the reference numeral 67, and which has a construction as best shown in FIG. 6. This is comprised of a laminated core having a plurality of radially extending pole teeth 68 which have enlarged head portions 69. These pole teeth 68 are circumferentially spaced from each other to define slots 71 therebetween. The enlarged head portions 69 leave a narrow mouth 72 therebetween opening into the slots 71.

Although not shown in details in FIGS. 5 through 7, individual coil windings are formed around the pole teeth 68 preferably in the manner described in the aforenoted co-pending application Ser. No. 10/064,923, based upon Japanese Application No. 2001-271207. The ends of these windings are connected, in a manner as described in the aforenoted co-pending application, to a commutator, indicated generally by the reference numeral 73 and specifically to the contact strips 74 thereof.

As best seen in FIG. 7, brushes 75 are carried by brush carriers 76 mounted on a commutator plate or brush holder 77. These brushes 75 are urged into engagement with the commutator strips 74 by springs 78.

The electrical current for energizing the windings is delivered through a terminal box 79 carried on the rear end cap 57. The electrical current is supplied to the brushes 75 from terminals 81. This electrical arrangement is of a type well known in the art and, for that reason; a detailed description of it is not believed to be necessary. Again, since the generally construction of the starter motor 51 is of the type well known in the art, its details of construction except for the insulator assemblies around which the coil windings are formed may be of any type known in the art. These insulators assemblies will now be described in detail by reference to FIGS. 8 through 14.

Figure 14:
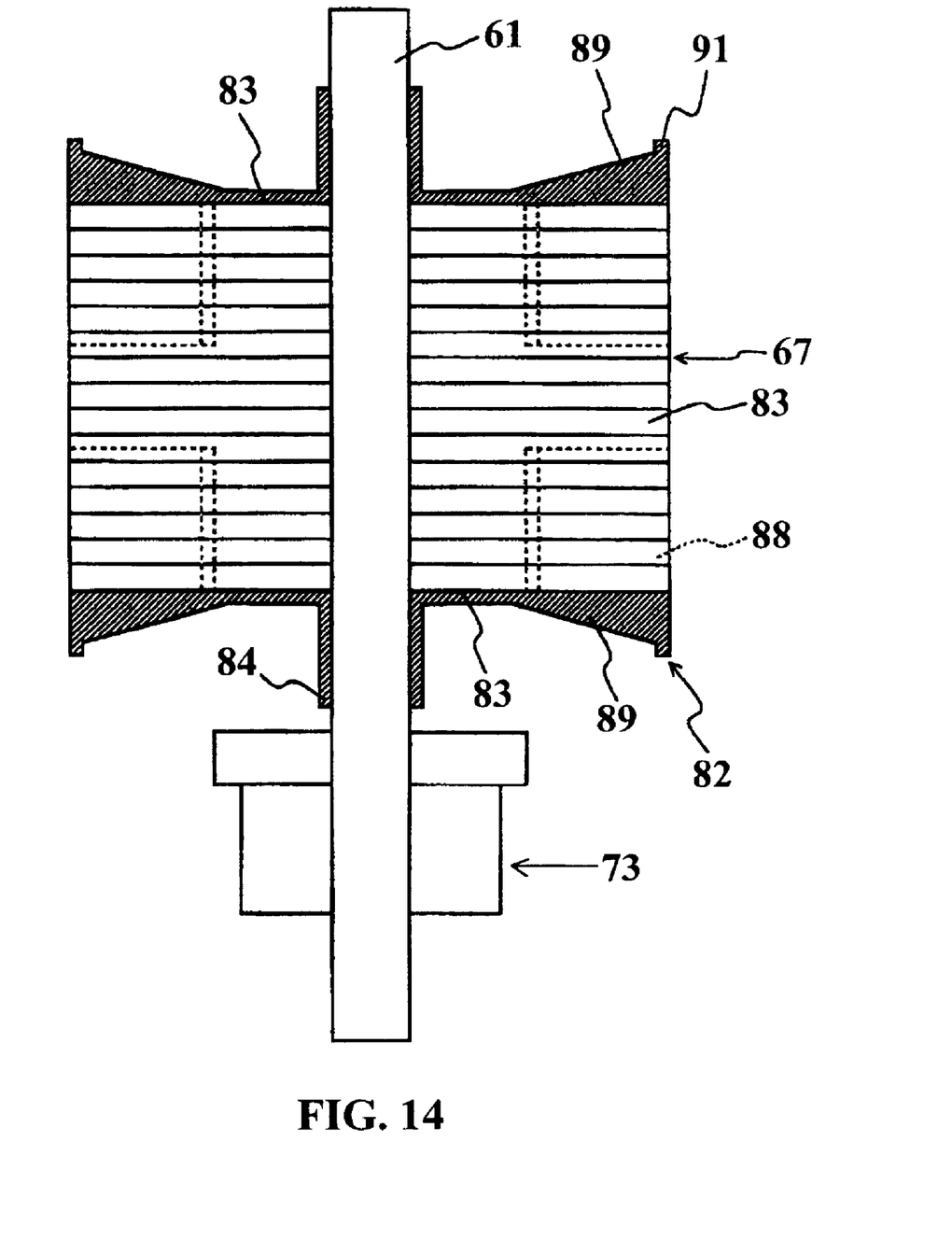
FIG. 14 is a cross sectional view, in part similar to FIG. 5, but is enlarged so as to show the construction of the armature and the laminations of its core and the insulator halves in place.

The insulator assemblies are indicated generally by the reference numeral 82. It is to be understood that the insulator assemblies 82 comprise a pair of assemblies, each of which is received around a respective side of the armature core 67, the laminations of which clearly are shown in FIG. 14 and indicated by the reference numeral 83.

Each insulator 82 according to this invention comprises a center hub part 84 having a through hole 85 for passing the respective end portion of the rotor shaft 61. Extending integrally outwardly from the center hub part 84 are a plurality of channel shaped, armature tooth covering parts, indicated generally at 86. Each of these channel shaped, armature tooth covering parts 86 is comprised of a coil end part covering portion 87, each of which is for covering a coil end surface of each of the magnetic pole teeth 68, and side portions 88 covering both side faces of each of the magnetic pole teeth and which face the slots 71 (see FIG. 6).

Figures 11, 12, 13:
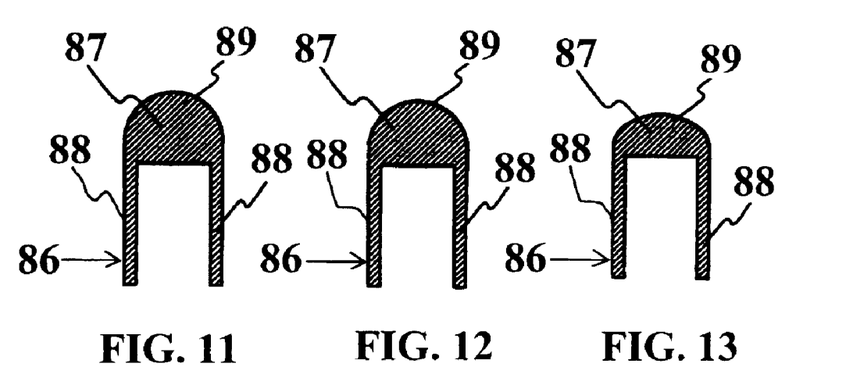
FIGS. 11, 12 and 13 are cross sectional views taken along the lines 11—11, 12—12 and 13—13 of FIGS. 8 and 10.

Each of the coil end part covering parts 87 of the insulator 82 has a thickness which is larger than that of the side portions 88 and a convex upper surface 89 (see FIGS. 11–13). Each of the coil end part covering parts 87 convex upper surface 89 slants downwardly from a protruding wall 91 formed on an outer peripheral end thereof.

Namely, as shown in FIG. 9 and FIGS. 11–13(A), the taper of the convex upper surface 89 slants such that the height thereof is gradually decreased from the side of the end (outer peripheral end) toward the side of the root of the magnetic pole tooth. Each of the channel shaped, armature tooth covering parts 86 has a protruding wall 91 protruding upward at the outer peripheral ends of the coil end part covering parts 87 for covering the core tooth end enlargements 69.

Each of the coil end part covering parts 87 of the insulator 82 has a large thickness, and thus has increased strength against the tensile force exerted by the coil winding of the wire. Especially, the insulator 82 can have strength against stress concentration on edges of the magnetic pole tooth 68, so that the insulator 82 is prevented from breaking in winding a wire on the magnetic pole tooth 68. Also, each of the coil end part covering parts 87 has a convex upper surface (semi-circular cross section in the illustrated example), so that the wire is guided by the edges of the convex upper surface when abutted thereon and wound around the magnetic pole tooth 68 smoothly.

Additionally, the convex surface of each of the coil end part covering parts 87 of the insulator 82 relaxes the stress concentration on the edges thereof at the time when the wire abuts thereon, and thus can protect the edges. Also, the taper allows the wound wire to be slid down thereon toward the side of the bottom of the slot by a winding tension applied thereto. This enables the wire to be wound smoothly in an aligned manner and makes the wire less likely to slip off the magnetic pole tooth, so that the wire can be stably maintained. The protruded wall 91 prevents the wire from slipping off the magnetic pole tooth 68.

As should be apparent from the foregoing, each of the coil end part covering parts of the insulator has a large thickness where a tensile force in the wire is applied, and thus has increased strength against a large tensile force. Also, each of the coil end part covering parts having a curved cross-sectional shape distributes stress concentration on the edges thereof and thus can prevent the insulator from being broken even when a large tensile force is applied thereto. This allows the wire to be smoothly wound, so that the wire can be tightly wound in an aligned manner on a magnetic pole tooth and stably maintained there around. Of course, the foregoing description is that of preferred embodiments of the invention and various changes and modifications may be made without departing from the spirit and scope of the invention, as defined by the appended claims.

What is claimed is:

1. A rotating electrical machine comprising an armature having a circular core of a magnetic material and a plurality of magnetic pole teeth extending radially from said circular core for cooperation with a plurality of circumferentially spaced permanent magnets, each of said magnetic pole teeth defining a core of generally rectangular cross section with slots formed between circumferentially adjacent pole teeth, an insulator having channel shaped portions covering at least in part said cores of said magnetic pole teeth, said channel shaped portions being comprised of radially extending slot portions extending along the sides of the pole teeth facing the slots and integrally joined by an axial portion extending across an axial outermost side of said pole teeth, said axial portion of said insulator channel shaped portions having a thickness greater than that of said side portions to avoid thinning at the juncture therebetween, coil windings wound around said cores of said magnetic pole teeth with said insulator being interposed therebetween.

2. A rotating electrical machine as set forth in claim 1 wherein the thickness of the axial portion of said insulator channel shaped portions varies along its radial position.

3. A rotating electrical machine as set forth in claim 2 wherein the thickness of the axial portion of said insulator channel shaped portions is greatest adjacent the outer ends of the pole teeth.

4. A rotating electrical machine as set forth in claim 3 wherein the thickness of the axial portion of said insulator channel shaped portions decreases gradually toward the circular core.

5. A rotating electrical machine as set forth in claim 1 wherein the axial portion of said insulator channel shaped portions are curved.

6. A rotating electrical machine as set forth in claim 5 wherein the thickness of the axial portion of said insulator channel shaped portions varies along its radial position.

7. A rotating electrical machine as set forth in claim 6 wherein the thickness of the axial portion of said insulator channel shaped portions is greatest adjacent the outer ends of the pole teeth.

8. A rotating electrical machine as set forth in claim 7 wherein the thickness of the axial portion of said insulator channel shaped portions decreases gradually toward the circular core.

9. A rotating electrical machine as set forth in claim 1 wherein the diameter of the wire of the coil windings is not less than 1 mm.

10. A rotating electrical machine as set forth in claim 1 wherein the core is formed by a plurality of laminated plates and the channel shaped portions of the insulator surround at least the axial outermost of said laminations.

11. A rotating electrical machine as set forth in claim 10 wherein each of the magnetic pole teeth define an enlargement at the terminal ends of the cores to define a narrow mouth opening into the slots and the insulator axially extending protruding end portions surround the pole teeth enlargements.

* * * * *